US010711809B2

(12) United States Patent
Fox et al.

(10) Patent No.: US 10,711,809 B2
(45) Date of Patent: Jul. 14, 2020

(54) AIRCRAFT HYDRAULIC SYSTEM WITH A DUAL SPOOL VALVE AND METHODS OF USE

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 278 days.

(21) Appl. No.: 15/952,464

(22) Filed: Apr. 13, 2018

(65) Prior Publication Data

US 2019/0316606 A1 Oct. 17, 2019

(51) Int. Cl.
| | |
|---|---|
| *F15B 13/04* | (2006.01) |
| *B64C 13/40* | (2006.01) |
| *F15B 11/08* | (2006.01) |
| *F15B 15/14* | (2006.01) |

(52) U.S. Cl.
CPC .......... *F15B 13/0402* (2013.01); *B64C 13/40* (2013.01); *F15B 11/08* (2013.01); *F15B 15/14* (2013.01); *F15B 2013/041* (2013.01); *F15B 2211/411* (2013.01)

(58) Field of Classification Search
CPC ...... F15B 13/0402; F15B 15/14; F15B 11/08; F15B 2211/411; F15B 2013/041; F15B 20/008; F15B 15/04; F15B 13/0842; F15B 13/044; F15B 2211/8757; F15B 2211/7053; F15B 2211/6313; F15B 2211/327; F15B 2211/30565; F15B 2211/30525; F15B 19/00; F15B 13/0401; B64C 13/40
See application file for complete search history.

(56) References Cited

U.S. PATENT DOCUMENTS

| | | | |
|---|---|---|---|
| 2,660,028 | A | 11/1953 | Geyer |
| 2,679,827 | A | 6/1954 | Perdue |
| 3,253,613 | A | 5/1966 | Richolt |

(Continued)

FOREIGN PATENT DOCUMENTS

| | | | | |
|---|---|---|---|---|
| DE | 102007029358 A1 | | 1/2009 | |
| EP | 1500825 A2 | * | 1/2005 | .......... F15B 13/0402 |

(Continued)

OTHER PUBLICATIONS

European Search Report dated Sep. 6, 2019 in re EP application No. 19169010.6 filed Apr. 12, 2019.

(Continued)

*Primary Examiner* — Valentina Xavier
(74) *Attorney, Agent, or Firm* — Coats & Bennett, PLLC

(57) ABSTRACT

A dual spool valve and methods of controlling hydraulic fluid that is moved to a hydraulic actuator of an aircraft. The dual spool valve may include first and second manifolds that each includes a movable spool. Multiple ports are positioned in each of the manifolds. The movable spools are positionable within their respective manifolds to control the movement of the hydraulic fluid that is supplied to and removed from the hydraulic actuator.

20 Claims, 20 Drawing Sheets

(56) References Cited

U.S. PATENT DOCUMENTS

| | | | |
|---|---|---|---|
| 3,585,902 A * | 6/1971 | Anderson | B64C 13/00 |
| | | | 91/363 A |
| 4,932,311 A | 6/1990 | Mibu et al. | |
| 5,074,495 A | 12/1991 | Raymond | |
| 5,144,851 A | 9/1992 | Grimm et al. | |
| 5,937,646 A | 8/1999 | Zakula | |
| 6,352,018 B1 | 3/2002 | Krisher | |
| 6,578,425 B2 * | 6/2003 | Hickman | B64C 13/40 |
| | | | 73/716 |
| 7,059,563 B2 | 6/2006 | Huynh | |
| 8,109,163 B2 | 2/2012 | Hudson et al. | |
| 8,359,851 B2 | 1/2013 | Haase | |
| 8,418,956 B2 * | 4/2013 | Fukui | B64C 13/42 |
| | | | 244/99.6 |
| 8,499,552 B2 | 8/2013 | Kauss et al. | |
| 9,334,914 B2 | 5/2016 | Gartner | |
| 9,618,102 B2 | 4/2017 | Hirai | |
| 9,709,052 B1 | 7/2017 | Tanju et al. | |
| 9,823,670 B2 | 11/2017 | Wilson et al. | |
| 9,969,233 B2 | 5/2018 | Leglize | |
| 9,994,304 B2 | 6/2018 | Ito | |
| 10,384,764 B2 | 8/2019 | Blanc et al. | |
| 2007/0194738 A1 | 8/2007 | Hirai | |
| 2015/0059325 A1 | 3/2015 | Knussman et al. | |
| 2015/0114151 A1 | 4/2015 | Hirai | |
| 2016/0091004 A1 | 3/2016 | Gomm et al. | |
| 2016/0096617 A1 | 4/2016 | Ito | |
| 2017/0233064 A1 | 8/2017 | McCormick et al. | |
| 2017/0335916 A1 | 11/2017 | Fox | |
| 2018/0135717 A1 | 5/2018 | Fox et al. | |
| 2018/0156293 A1 | 6/2018 | Fox et al. | |

FOREIGN PATENT DOCUMENTS

| | | |
|---|---|---|
| EP | 1500825 A2 | 1/2005 |
| EP | 1710446 A2 | 10/2006 |
| EP | 3067252 A1 | 9/2016 |

OTHER PUBLICATIONS

European Search Report dated Sep. 3, 2019 in re EP application No. 19167685.7 filed Apr. 5, 2019.

Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.

Avago Technologies, "Optical Mouse Sensors," AV00-0115EN, May 14, 2007, pp. 1-24.

* cited by examiner

AIRCRAFT HYDRAULIC SYSTEM WITH A DUAL SPOOL VALVE AND METHODS OF USE

BACKGROUND

Aircraft include one or more movable flight control members such as ailerons on the wings for roll control, elevators on the horizontal tail of the empennage for pitch control, a rudder on the vertical tail of the empennage for yaw control, a nose cone of a missile, and other movable control surfaces. Movement of a flight control member is typically effected by one or more actuators mechanically coupled between a support member (e.g., a wing spar) and the flight control member. In many aircraft, the actuators for flight control members are linear hydraulic actuators driven by one or more hydraulic systems.

Hydraulic systems for aircraft are designed to provide hydraulic fluid to the hydraulic actuators to move and position the flight control members as necessary during the flight of the aircraft. The hydraulic systems can include a series of supply and return lines. One or more actuators are positioned along the supply and return lines and are attached to the flight control members. One or more pumps move the hydraulic fluid through the hydraulic system and supply it to the actuators. The hydraulic fluid is directed into different sections of the actuator to elongated and shorten the actuator and thus adjust the flight control member. The hydraulic fluid from the actuator is moved into the return line which returns the hydraulic fluid to the pump to be reused in the hydraulic system.

Valves are positioned near the actuators to control the movement of fluid into and out of the actuators. The valves should provide the flow of the hydraulic fluid to control the actuators during varying loads that are placed on the flight control members, and to meet rate demands for movement of the flight control members. The valves should be configured to provide the necessary hydraulic fluid to provide effective movement of the flight control members during a flight.

SUMMARY

One aspect is directed to a valve to direct hydraulic fluid to a hydraulic actuator in an aircraft. The valve includes a first port to receive hydraulic fluid from a supply line, and a second port to discharge hydraulic fluid to a return line. The valve includes first and second valve sections each having a manifold, a first line fluidly connected to the first port, a second line fluidly connected to the second port, and a third line fluidly connected to the hydraulic actuator and with the manifold of the first valve section being spaced away from the manifold of the second valve section. A first spool is positioned in the first manifold and a second spool is positioned in the second manifold. Each of the first and second spools is configured to prevent the flow of hydraulic fluid when aligned with one of the first and second lines. Each of the first and second spools is independently positionable within the respective first and second manifolds between a first position aligned with just one of the first and second lines, and a second position aligned with just the other of the first and second lines. The first and second spools are spaced away from the third lines in each of the first and second positions to allow hydraulic fluid to flow into and out of the actuator.

In one aspect, the valve includes that each of the first and second spools includes a first block and a second block that are spaced apart along a shaft and with the first blocks aligned with one of the first and second lines in the first position and with the second blocks aligned with the other of the first and second lines in the second position and with both the first and second blocks positioned away from the third lines in each of the first and second positions.

In one aspect, the valve includes that the first lines of the first and second valve sections share a first common section and the second lines of the first and second valve sections share a second common section.

In one aspect, the valve includes that each of the first and second valve sections is a 3-way valve.

One aspect is directed to an assembly to position a flight control member of an aircraft. The assembly includes a hydraulic actuator operatively connected to the flight control member and including a piston, a first chamber on a first side of the piston, and a second chamber on a second side of the piston. A dual spool valve includes first and second manifolds that each includes a supply port configured to receive fluid from a supply line, a return port configured to move fluid to a return line, and an actuator port configured to move fluid to the actuator. A first spool is movably positioned in the first manifold and a second spool is movably positioned in the second manifold. The first and second spools are independently movable between a first position and a second position. In the first position, the first and second spools block the supply ports to prevent hydraulic fluid from moving from the supply line to the actuator and being away from the return ports to allow hydraulic fluid to move from the actuator to the return line. In the second position, the first and second spools are positioned away from the supply ports to allow hydraulic fluid to move from the supply line to the actuator and block the return ports to prevent hydraulic fluid from moving from the actuator to the return line. The first and second spools are positioned away from the actuator ports in each of the first and second positions to allow hydraulic fluid to flow into and out of the actuator.

In one aspect, the assembly includes that the first spool is in the first position when the second spool is in the second position.

In one aspect, the assembly includes that the actuator port of the first manifold is fluidly connected to the first chamber of the actuator and the actuator port of the second manifold is fluidly connected to the second chamber of the actuator.

In one aspect, the assembly includes that each of the first and second spools includes a first block and a second block that are spaced apart along a shaft with the first and second blocks sized with one of the first and second blocks extending across one of the return and supply ports in each of the first and second positions.

In one aspect, the dual spool valve also includes first lines that extend between the supply line and the supply ports and second lines that extend between the return line and the return ports with the first lines being isolated from the second lines.

In one aspect, the assembly includes that the first lines share a first common section and the second lines share a second common section.

One aspect is directed to a method of controlling a dual spool valve to control a hydraulic actuator and move a flight control member of an aircraft. The method includes positioning a first spool in a first manifold at a second position and opening a supply port in the first manifold and moving hydraulic fluid from a supply line and into a first chamber of a hydraulic actuator and positioning a second spool in a second manifold at a first position and opening a return port in the second manifold and moving hydraulic fluid from a second chamber of the hydraulic actuator to a return line and moving a piston of the hydraulic actuator in a first direction. The method includes positioning the first spool in the first manifold at a first position and opening a return port in the first manifold and positioning the second spool in the second manifold at the first position and opening the return port in the second manifold and moving hydraulic fluid from the first chamber of the hydraulic actuator through the return port in the first manifold and through the return port in the second manifold and into the second chamber of the hydraulic actuator and moving the piston of the hydraulic actuator in a second direction. The method includes positioning the first spool in the first manifold at the first position and opening the return port in the first manifold and moving hydraulic fluid from the first chamber to the return line and positioning the second spool in the second manifold to a second position and opening a supply port in the second manifold and moving hydraulic fluid from the supply line and into the second chamber of the hydraulic actuator and moving the piston of the hydraulic actuator in the second direction. The method includes positioning the first spool in the first manifold at the first position and opening the return port in the first manifold and positioning the second spool in the second manifold to the first position and opening the return port in the second manifold and moving hydraulic fluid from the second chamber of the hydraulic actuator through the return port in the second manifold and through the return port in the first manifold and into the first chamber of the hydraulic actuator and moving the piston of the hydraulic actuator in the first direction.

In one aspect, the method also includes moving hydraulic fluid through the first manifold when moving hydraulic fluid into and from the first chamber of the hydraulic actuator and moving hydraulic fluid through the second manifold when moving hydraulic fluid into and from the second chamber.

In one aspect, the method also includes positioning the first spool in the first manifold at the first position and blocking hydraulic fluid from moving into the first chamber through the supply port of the first manifold.

In one aspect, the method also includes positioning the first spool in the first manifold at the second position and blocking hydraulic fluid from moving through the return port of the first manifold.

In one aspect, the method also includes positioning the second spool in the second manifold at the first position and blocking hydraulic fluid from moving into the second chamber through the supply port of the second manifold.

In one aspect, the method also includes positioning the second spool in the second manifold at the second position and blocking hydraulic fluid from moving through the return port of the second manifold.

In one aspect, the method also includes moving the first spool independently from the second spool.

In one aspect, the method also includes sensing a pressure of the hydraulic fluid in each of the first and second chambers and a pressure of the hydraulic fluid in the supply line.

In one aspect, a hydraulic system of an aircraft that operates according to the above methods.

In one aspect, an aircraft with a dual spool valve that operates according to the above methods.

DETAILED DESCRIPTION

Figure 1:
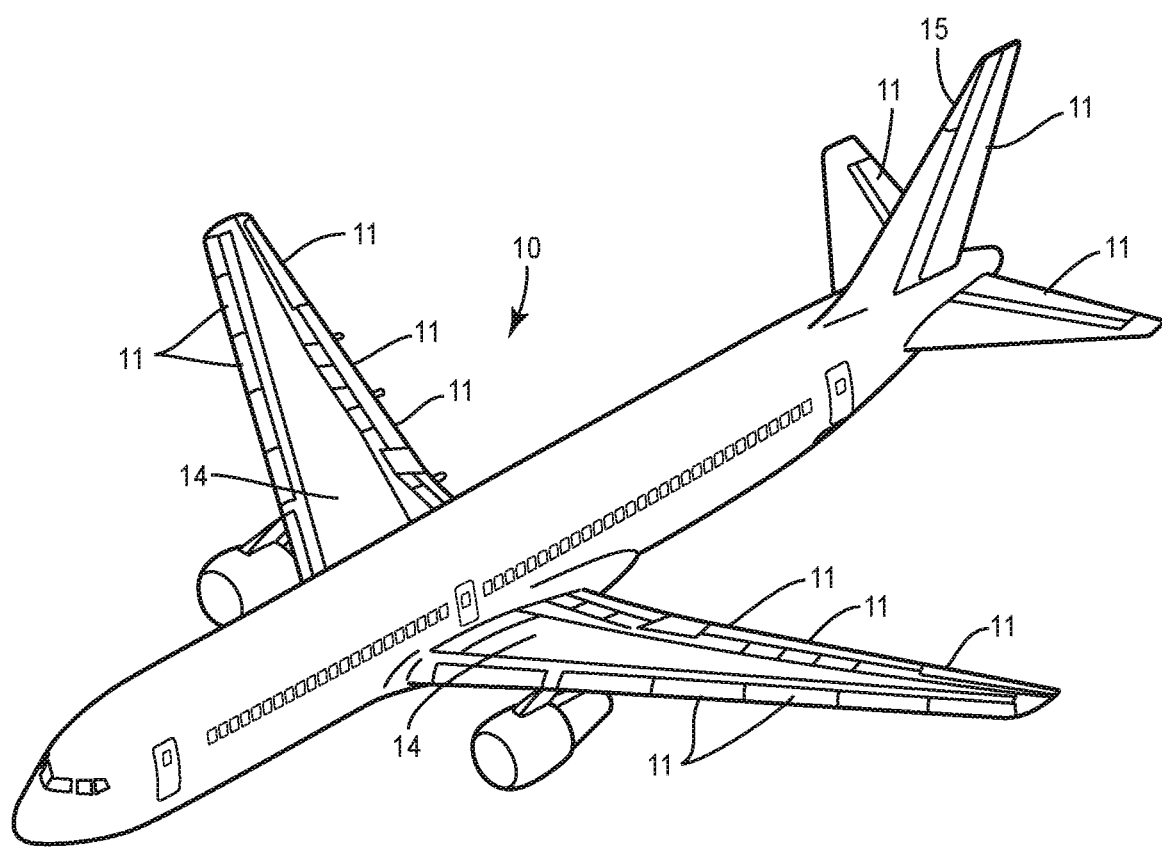
FIG. 1 is a perspective view of an aircraft.
Figure 2:
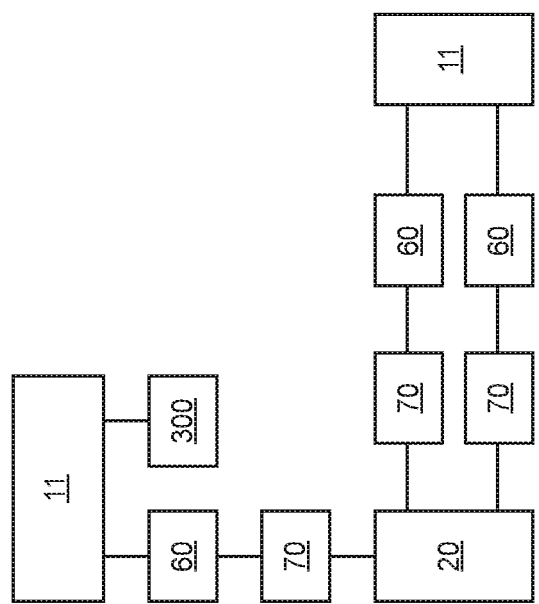
FIG. 2 is a schematic view of a hydraulic system and actuators that move flight control members.
Figure 3:
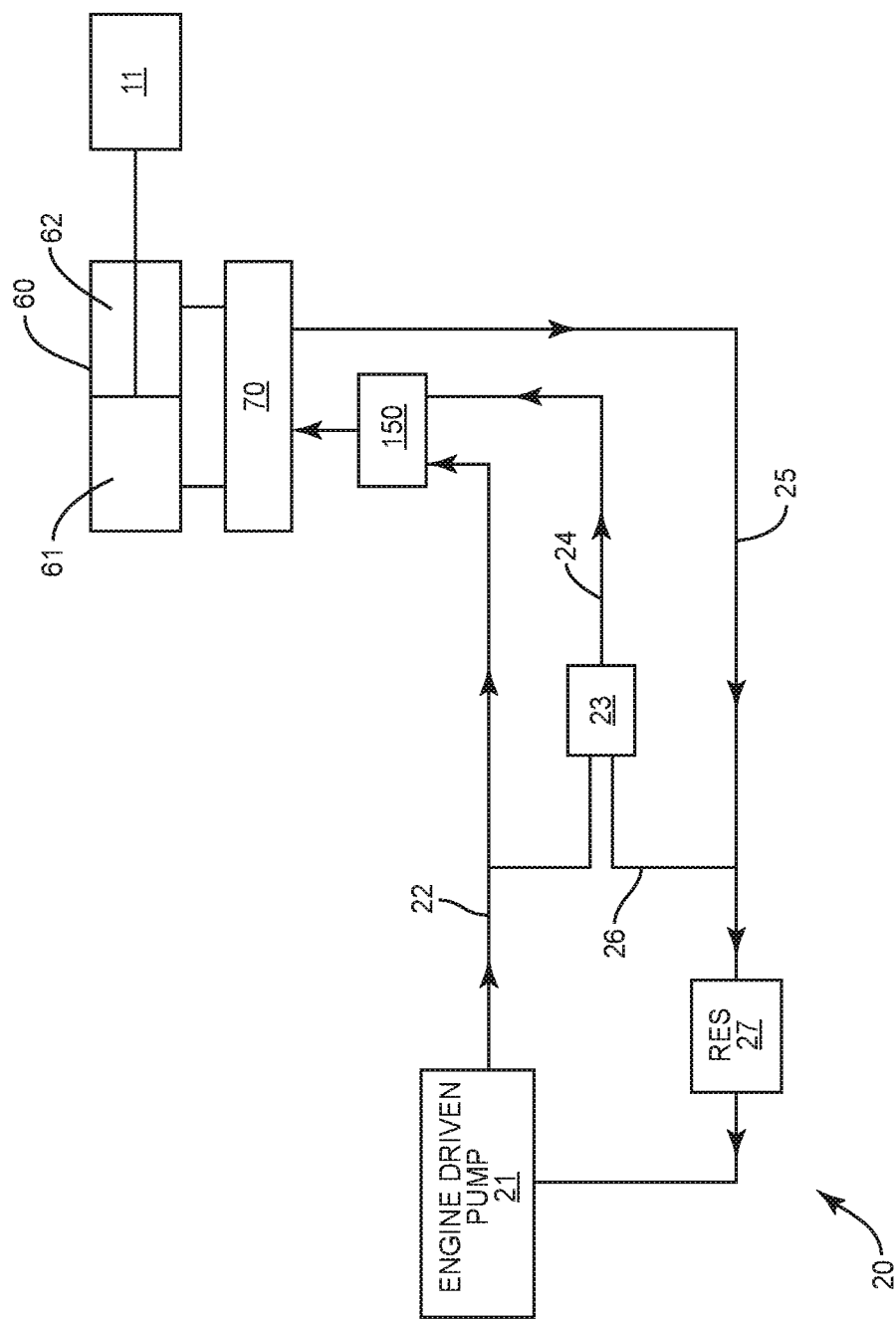
FIG. 3 is a schematic diagram of a hydraulic system that supplies hydraulic fluid to and from an actuator.

An aircraft 10 can include one or more flight control members 11. As illustrated in FIG. 1, flight control members 11 can include but are not limited to a rudder, elevators, ailerons, wing leading and trailing edge devices, and spoilers. The flight control members 11 are movably attached to various sections of the aircraft 10 including the wings 14 and tail 15 to change their orientation to control the flight. As illustrated in FIG. 2, one or more actuators 60 are connected to the flight control members 11 to control the orientation relative to the remainder of the aircraft 10. A hydraulic system 20 supplies hydraulic fluid to first and second chambers 61, 62 of the actuators 60 to adjust the orientation of the flight control members 11. Prior to reaching the actuators 60, the hydraulic fluid moves through a valve 70 that controls the flow into and out of the chambers 61, 62. Inerters 300 can also be positioned to extend between a support member and the flight control member 11 and work with the actuators 60 for damping of the flight control member FIG. 3 illustrates an overview of a hydraulic system 20 that supplies hydraulic fluid to the actuators 60. Although FIG. 3 includes a single actuator 60, the hydraulic system 20 is capable of supplying hydraulic fluid to multiple actuators 60. The hydraulic system 20 includes an engine driven pump 21 that supplies the hydraulic fluid at a supply pressure through a supply line 22 to the actuators 60. The engine driven pump 21 can supply the hydraulic fluid at a variety of different pressures. One specific design includes a system pressure of 1200 psi.

A boost pump 23 can supply hydraulic fluid at an elevated pressure to the actuators 60. The boost pump 23 can be necessary to supply the hydraulic fluid when the hydraulic fluid supplied by the engine driven pump 21 falls below a predetermined pressure. The boost pump 23 is able to supply hydraulic fluid at a variety of pressures. One design includes supplying hydraulic fluid at a pressure of 3000 psi.

A boost line 24 extends between the boost pump 23 and the valve 70 to supply the boosted hydraulic fluid to the actuator 60. A return line 25 moves the hydraulic fluid from the actuators 60 and the valve 70. The return line 25 leads to a reservoir 27 where the hydraulic fluid can be stored and cooled before being re-supplied to the engine driven pump 21. A spare line 26 extends from the return line 25 and leads to the boost pump 23. In the event an inadequate amount of hydraulic fluid is available at the boost pump 23, returning hydraulic fluid can be supplied to the boost pump 23 before it is moved along the return line 25 to the reservoir 27. A manifold 150 (see also FIG. 10) can receive hydraulic fluid from both supply line 22 and boost line 24 and supply the hydraulic fluid to the valve 70.

The boost pump 23 is positioned along the hydraulic system 20 away from the engine driven pump 21. This distributed architecture can provide for more responsiveness as hydraulic fluid at an elevated pressure can be supplied to the actuators 60 in less time. The distributed architecture also allows for hydraulic fluid from the actuators 60 to bypass a portion of the return line 25 and be directed to the boost pump 23. This feature saves energy loss due to a pressure drop in the return line 25 that routes the hydraulic fluid back to the engine driven pump 21. The supply line 22 from the engine driven pump 21 can also be reduced in size to save weight since hydraulic fluid at higher pressures does not move this section of the hydraulic system 20.

Figure 4:
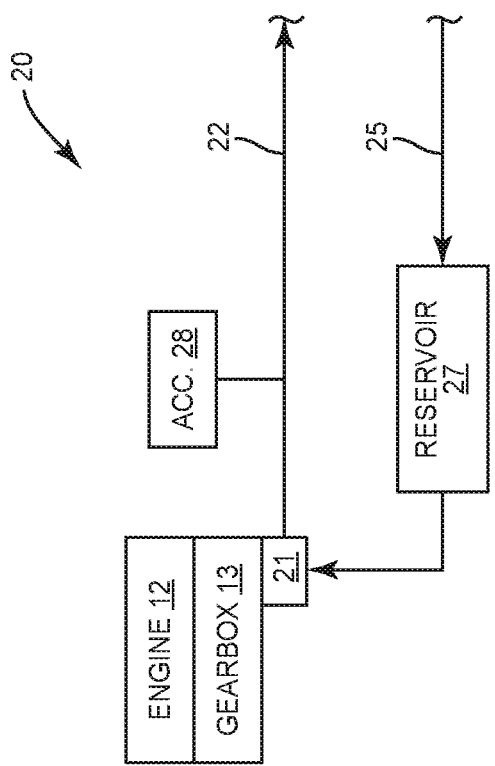
FIG. 4 is a partial schematic view of a portion of a hydraulic system.

FIG. 4 illustrates a section of a hydraulic system 20 that includes the engine driven pump 21 positioned at an engine 12 of the aircraft 10. Mechanical power generated by the engine 12 is converted into hydraulic or electrical power for distribution about the aircraft 10. A gearbox 13 can integrate or couple the engine 12 to the engine driven pump 21. The gearbox 13 can also integrate or couple the engine 12 to an electric generator and/or environmental control system (not illustrated). The engine driven pump 21 converts mechanical power provided by the engine 12 into hydraulic power for distribution about the hydraulic system 20.

An accumulator 28 can be connected to the supply line 22 downstream from the engine driven pump 21 to supply additional hydraulic fluid for use in the hydraulic system 20. The accumulator 28 can supply hydraulic fluid in certain circumstances, such as but not limited to when a volume of hydraulic fluid moving along the supply line 22 drops below a predetermined level or when a pressure of the hydraulic fluid in the supply line 22 is below a predetermined level.

The reservoir 27 is positioned along the return line 25 upstream from the engine driven pump 21. The reservoir 27 stores the hydraulic fluid at a working pressure and can also provide for cooling the hydraulic fluid prior to being re-introduced back to the engine driven pump 21.

The aircraft 10 can include multiple hydraulic systems 20 to control the movement of the various flight control members 11. This can include a first hydraulic system 20 that extends along a first portion of the aircraft (e.g., starboard side). The first hydraulic system 20 includes an engine driven pump 21 that is driven by a first engine (e.g., a starboard engine). A second hydraulic system 20 can be positioned on a second portion of the aircraft and include a separate engine driven pump 21 that is driven by a different engine. The number of hydraulic systems 20 in an aircraft 10 can vary. Further, the engines 12 can drive different numbers of engine driven pumps 21. For example, an aircraft 10 can include four main engines, namely two left main engines and two main right engines. Each main engine can drive two engine driven pumps 21. Additionally, the aircraft 10 can include two hydraulic systems 20, where four engine driven pumps 21 associated with the left main engines 12 produce hydraulic power to a left hydraulic system 20 and four engine driven pumps 21 associated with the right main engines 12 produce hydraulic power to a right hydraulic system 20.

Figure 5:
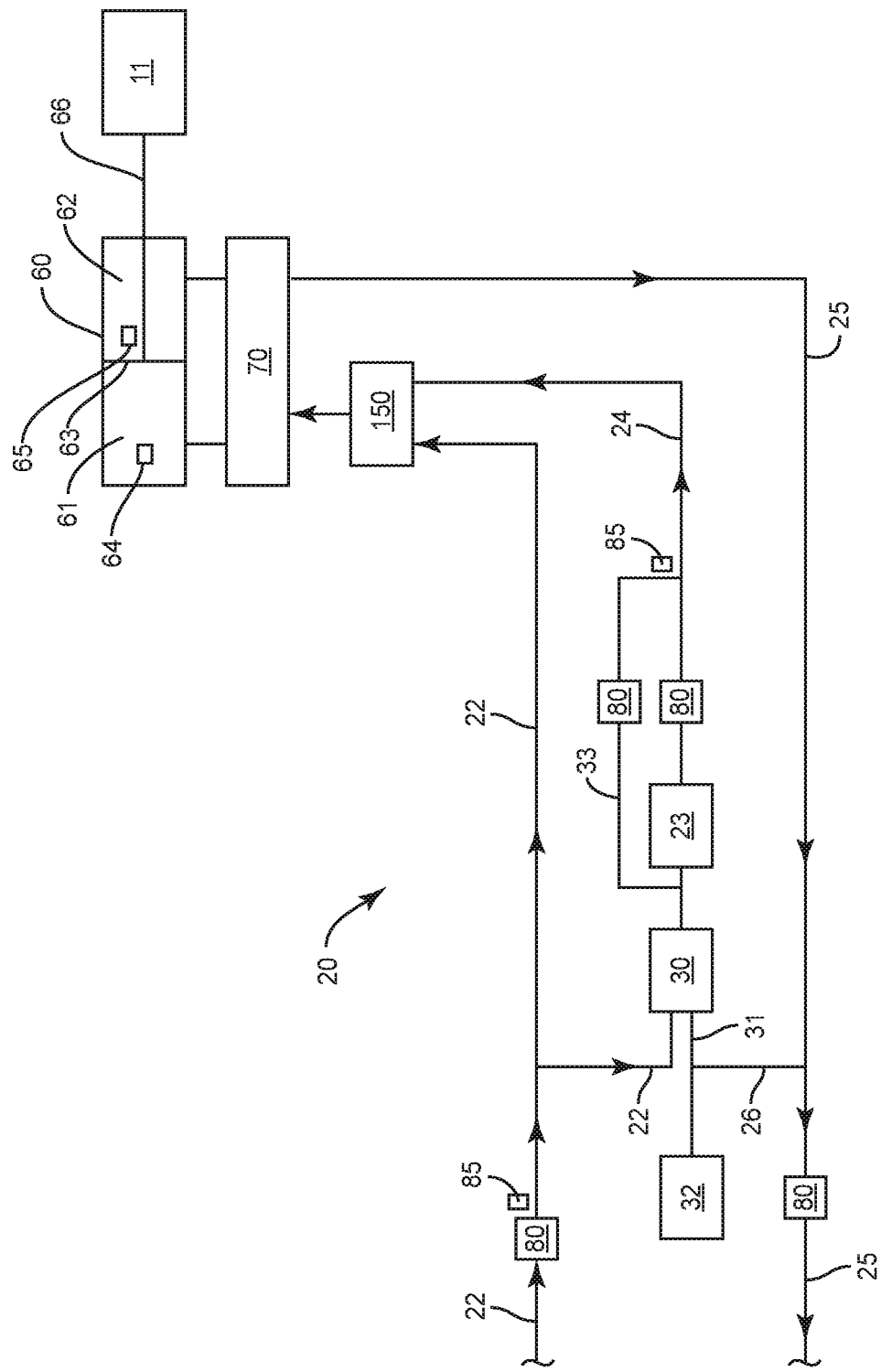
FIG. 5 is a partial schematic view of a portion of a hydraulic system and an actuator that receives hydraulic fluid from the hydraulic system.

FIG. 5 illustrates another section of the hydraulic system 20 that receives the hydraulic fluid along supply line 22 from the engine driven pump 21 and returns the hydraulic fluid back through the return line 25 to the reservoir 27. The supply line 22 leads to the valve 70 to supply hydraulic fluid at system pressure from the engine driven pump 21. The supply line 22 also branches and leads to the boost pump 23. One or more check valves 80 can be positioned along the supply line 22 to prevent movement of the hydraulic fluid m the reverse direction (i.e., towards the engine driven pump 21).

The boost pump 23 is configured to move hydraulic fluid at an elevated pressure through a boost line 24 to the valve 70. The boost pump 23 can be able to supply the hydraulic fluid at variable pressures.

Figure 6:
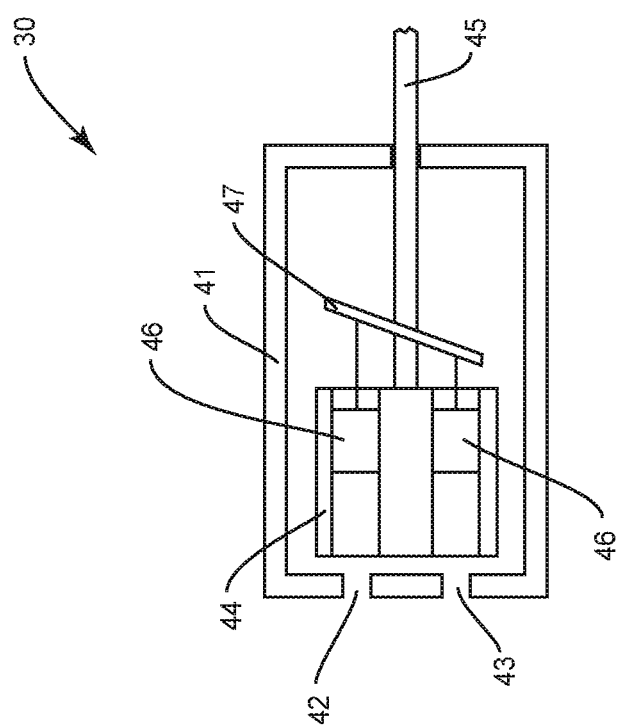
FIG. 6 is a schematic diagram of a hydraulic pump.

One type of hydraulic pump 21, 23 is an axial piston pump which can also be referred to as a swash-plate pump. FIG. 6 illustrates an axial piston pump that includes a housing 41 with an inlet 42 and an outlet 43. A block 44 is positioned within the housing 41 and rotates on a shaft 45. Pistons 46 are positioned within cylinders in the block 44 and contact against a stationary swashplate 47. The swashplate 47 is positioned at an angle relative to the block 44. The pistons 46 extend outward from the block 44 and contact against the swashplate 47 during rotation of the block 44. The pistons 46 remain in contact with the swashplate 47 during the rotation resulting in a reciprocating motion that drives the hydraulic fluid through the outlet 43. The pumps 21, 23 can also include other types of hydraulic pumps that can move pressurized fluid through the supply lines 22, line 24.

A valve 30 is positioned upstream from the boost pump 23 to control the source of hydraulic fluid that is supplied to the boost pump 23. The valve 30 can be a shuttle valve that is positionable between first and second valve positions based on the pressure of the hydraulic fluid at the valve 30. In the first valve position, the valve 30 passes hydraulic fluid from just the supply line 22 to the boost pump 23. In the second valve position, the valve 30 passes hydraulic fluid from just the spare line 26 and an accumulator 32 to the boost pump 23. The valve 30 can be a shuttle valve that is sprung from the first valve position to the second valve position to assure an adequate amount of hydraulic fluid is supplied to the boost pump 23.

The accumulator 32 is positioned upstream from the boost pump 23 and holds hydraulic fluid that can be supplied to the boost pump when the valve 30 is in the second valve position. The accumulator 32 assures the spare line 26 provides adequate flow of hydraulic fluid when the valve 30 is in the second valve position. The close proximity of the accumulator 32 to the boost pump 23 provides for an efficient supply of hydraulic fluid as little pressure is lost while the hydraulic fluid moves from the accumulator 32 to the boost pump 23.

A check valve 80 is positioned along the return line 25 downstream from the spare line 26 to protect against pulling fluid from this downstream section of the return line 25. This isolation adds robustness to the distributed hydraulic system 20 when it is attached to another hydraulic system, such as a central circuit that protects both circuits from unnecessary coupling. The check valve 80 assures that the hydraulic fluid in the return line 25 downstream from the spare line 26 does not move the wrong direction.

A bypass line 33 extends around the boost pump 23. In the event of failure of the boost pump 23, hydraulic fluid can be supplied to the boost line 24 through the bypass line 33. Check valves 80 are positioned along both the bypass line 33 and the line immediately downstream from the boost pump 23 to prevent the hydraulic fluid from flow in the wrong direction during periods of differing pressure differentials among the different sections of the hydraulic system 20.

The actuator 60 includes first and second chambers 61, 62 that are separated by a piston 63. A rod 66 extends from the piston 63 and is attached to the flight control member 11. Hydraulic fluid is introduced and removed from each of the first and second chambers 61, 62 to control the movement of the piston 63 and rod 66 and the connected flight control member 11.

Sensors are positioned to detect the pressure of the hydraulic fluid at various locations around the hydraulic system 20. Sensor 64 is positioned to sense the pressure of the hydraulic fluid in the first chamber 61. Sensor 65 is positioned to sense the pressure in the second chamber 62. A sensor 85 is positioned downstream from the boost pump 23 to detect the pressure of the hydraulic fluid being fed into the boost line 24. A sensor 85 can also be positioned along the supply line 22 to determine the pressure of the hydraulic fluid from the engine driven pump 21. Various types of sensors 64, 65, 85 can be used, including but not limited to pressure transducers.

Figure 7:
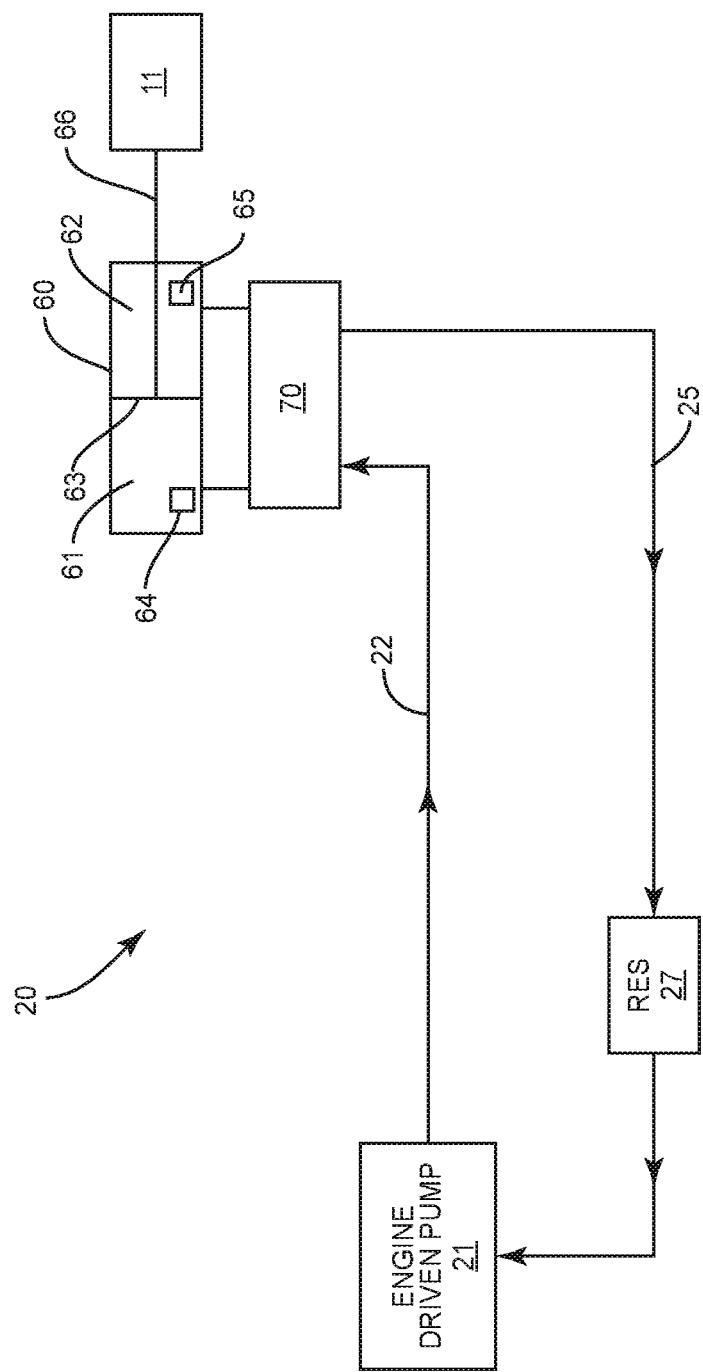
FIG. 7 is a schematic diagram of a hydraulic system that supplies hydraulic fluid to and from an actuator.

FIG. 7 illustrates a hydraulic system 20 without a boost pump 23. Hydraulic fluid at system pressure is supplied from the engine driven pump 21 to the valve 70. A return line 25 moves the hydraulic fluid to a reservoir 27 to be re-introduced to the engine driven pump 21.

Figure 8:
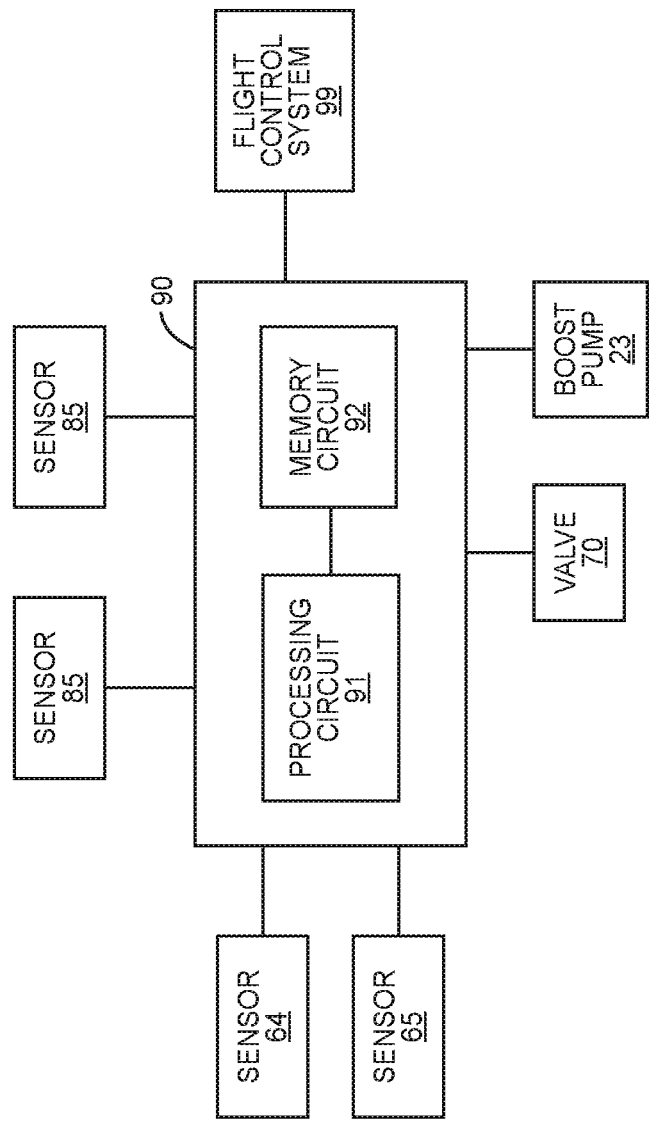
FIG. 8 is a schematic diagram of an actuation control unit.

An actuation control unit 90 can control the movement of hydraulic fluid through the hydraulic system 20. FIG. 8 illustrates an actuation control unit 90 that includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and may include various memory devices such as random access memory, read-only memory, and flash memory.

The actuation control unit 90 can receive signals from the sensors 64, 65, 85 positioned along the hydraulic system 20. The actuation control unit 90 can communicate with a flight control system 99 that controls one or more functions of the aircraft 10. The flight control system 99 can provide various data to the actuation control unit 90, such as but not limited to the commanded movements of the flight control member 11.

The actuation control unit 90 controls the movement of the hydraulic fluid through the hydraulic system 20 to position the flight control member 11 in its commanded position. The actuation control unit 90 uses inputs from the sensors 64, 65, 85 to control the boost pump 23 and valve 70 to supply the needed hydraulic fluid.

The valve 70 directs the supply hydraulic fluid into the actuator 60 through the feed lines and directs the hydraulic fluid from the actuator 60 to the return line 25. The valve 70 is adjustable between various settings to control the hydraulic fluid as necessary to ensure proper operation of the actuator 60 and movement of the flight control member 11. Valve 70 as illustrated in FIG. 8 can be controlled by one or more solenoids 171 that are controlled by the actuation control unit 90.

Figure 9:
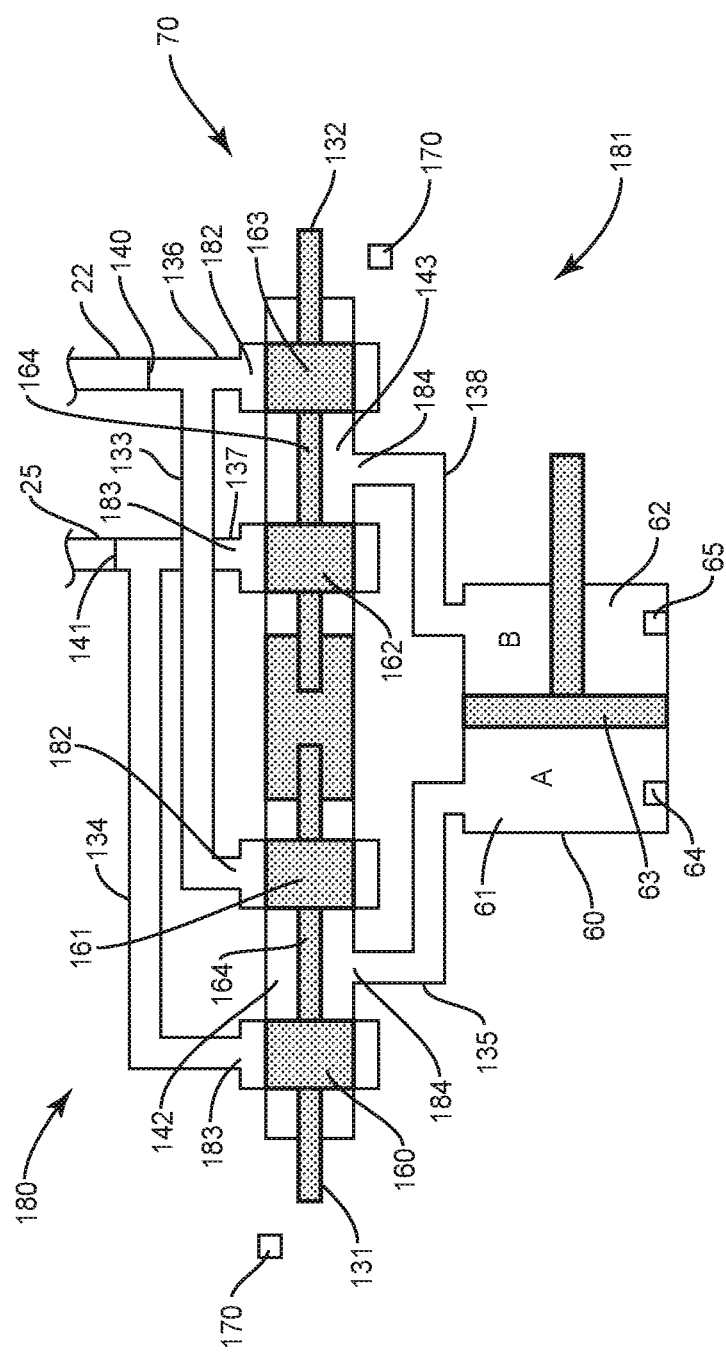
FIG. 9 is a schematic view of a dual spool valve.
Figure 10:
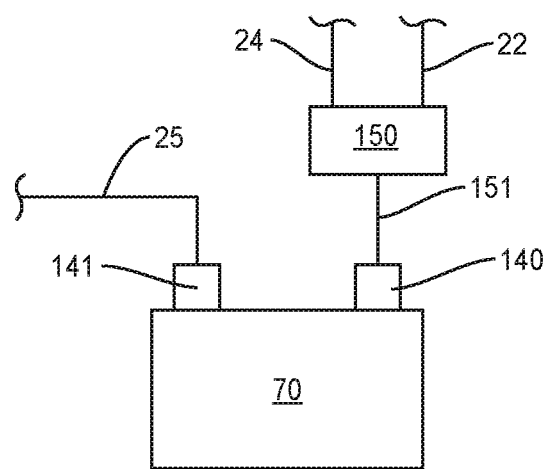
FIG. 10 is a schematic view of a manifold for supply lines of a hydraulic system.

FIG. 9 illustrates a valve 70 that controls the hydraulic fluid flow to and from the actuator 60. The valve 70 includes a first port 140 to receive hydraulic fluid and a second port 141 to discharge hydraulic fluid to the return line 25. As illustrated in FIG. 10, a manifold 150 can receive hydraulic fluid from both supply line 22 and boost line 24 and output the hydraulic fluid through line 151 and into the first port 140 of the valve 70. In hydraulic systems 20 with a single supply line (see FIG. 7), the supply line can connect directly to the port 140 without the need for a manifold 150. The manifold 150 can be integrated with the valve 70 or can be positioned upstream from the valve 70. The manifold 150 can include check valves and/or shuttle valves. In one design, the check valves include different cracking pressures to avoid cross talk between the pumps 21, 23.

As illustrated in FIG. 9, the valve 70 includes a first valve section 180 and a second valve section 181. The first valve section 180 includes a first manifold 142 and the second valve section 181 includes a second manifold 143. Each manifold 142, 143 includes a first supply port 182, a second return port 183, and a third actuator port 184. A line 133 that extends between the first port 140 and the first manifold 142. A line 136 extends from the first port 140 to the second manifold 143. Further, a line 134 extends between the first manifold 142 and the second port 141. A 137 extends between the second manifold 143 and the second port 141. A line 135 extends between the first manifold 142 and the first chamber 61 of the actuator 60. A line 138 extends between the second manifold 143 and the second chamber 62 of the actuator 60.

The valve 70 is a dual spool valve that includes a first spool 131 and a second spool 132. Each of the spools 131, 132 is individually controllable and can be positioned regardless of the position of the opposing spool 131, 132. The first spool 131 includes a pair of blocks 160, 161 positioned along a shaft 164. Likewise, the second spool 132 includes blocks 162, 163 positioned along a shaft 164. Solenoids 171 are operatively connected to the first and second spools 131, 132 and are operated by the actuation control unit 90 to control their positioning within the respective manifolds 142, 143. The first spool 131 controls the flow of hydraulic fluid into and out of a first chamber 61 of the actuator 60. The second spool 132 controls the flow of hydraulic fluid into and out of a second chamber 62. The movement of hydraulic fluid into and out of the chambers 61, 62 controls the movement of a piston 63 of the actuator 60 which is connected to the flight control member 11 and able to control an aspect of the flight of the aircraft 10. FIG. 9 includes each of the first and second spools 131, 132 in closed positions to prevent the flow of hydraulic fluid into or out of the actuator 60.

The positioning of the valve 70 is also determined based on a commanded position received from the flight control system 99. The flight control system 99 or the actuation control unit 90 can determine a rate of the flight control member 11 which is the direction and speed required for the flight control member 11 to be moved to control the flight of the aircraft 10.

Figure 19:
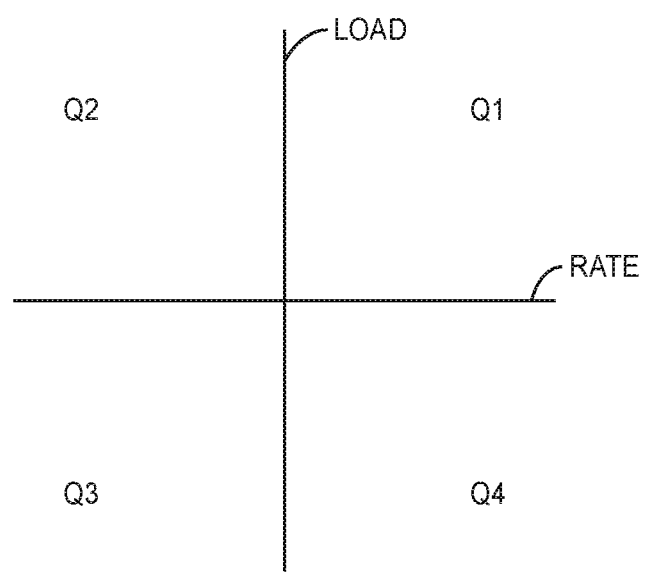
FIG. 19 is a coordinate grid with rate and load applied to an actuator.

FIG. 19 illustrates a diagram of the forces acting on the piston 63 through the flight control member 11 that affect the required movement of hydraulic fluid through the hydraulic system 20. A first axis (i.e., the x-axis) represents the rate of movement of the piston 63 and thus the flight control member 11. The rate can be either positive when the piston 63 moves in a first direction and negative when the piston 63 moves m the opposing second direction. The second axis (i.e., the y-axis) is the load placed on the piston 63 through the flight control member 11. The load can be positive when applied to the piston 63 in a first direction and negative when applied in a second direction. The diagram of FIG. 19 includes the four quadrants Q1, Q2, Q3, and Q4 based on the rate and load requirements.

The actuation control unit 90 uses one or more of the sensed pressures of the hydraulic fluid in one or both of the first and second chambers 61, 62 and along one or more of the supply line 22 and boost line 24 in combination with the commanded rate from the flight control system 99 to determine the positions of the first and second spools 131, 132 and then derive the mode.

Figure 11:
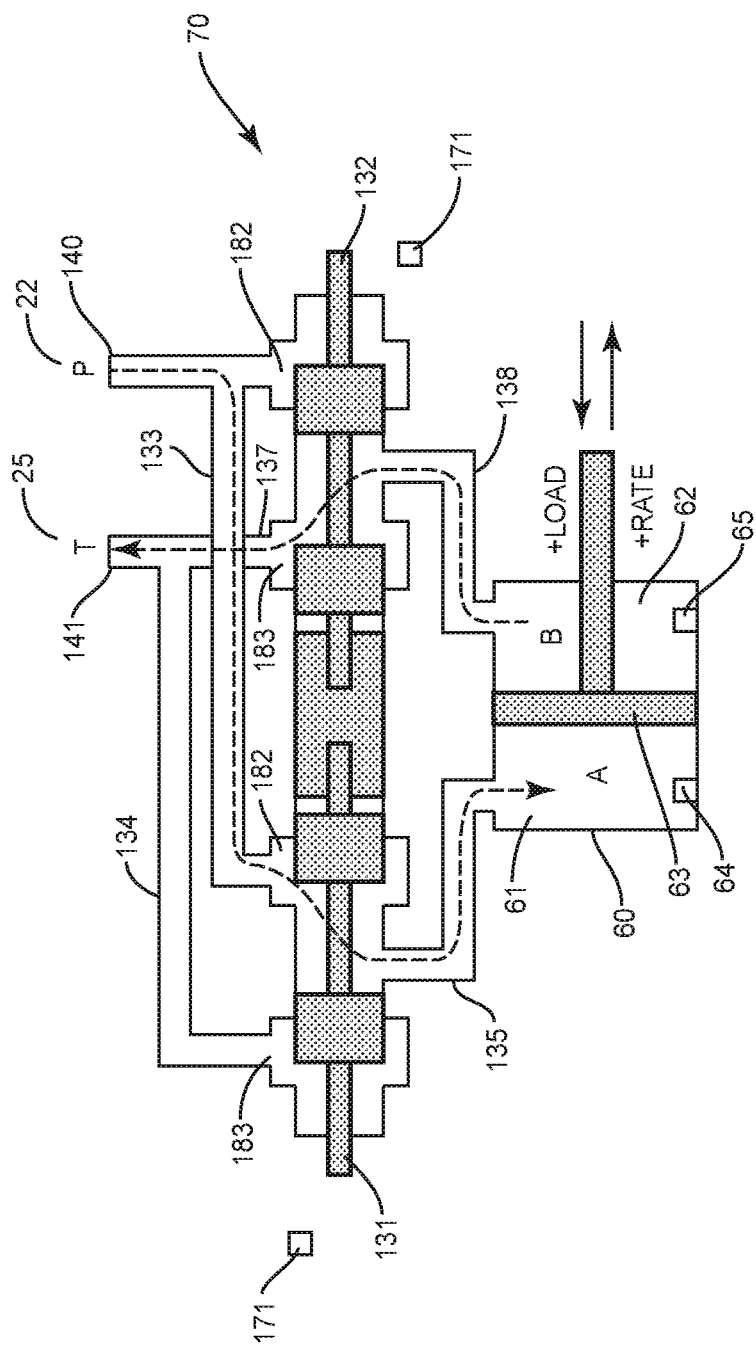
FIG. 11 is a schematic view of a dual spool valve providing first quadrant control to an actuator.

FIG. 11 illustrates the actuator 60 within the first quadrant Q1 with a positive load and a positive rate. In the first quadrant Q1, the rate is controlled by the flow of hydraulic fluid through the port 140 and into the first chamber 61. As illustrated, the first spool 131 is positioned in a second position for hydraulic fluid from the supply line 22 to enter into the first chamber 61 through lines 133-135. The first spool 131 also blocks port 183. The second spool 132 is in a first position to open the port 183 of the second chamber 62 to allow hydraulic fluid to exit to the return line 25 through lines 138-137. The second spool 132 also blocks port 182 in this first position.

Figure 12:
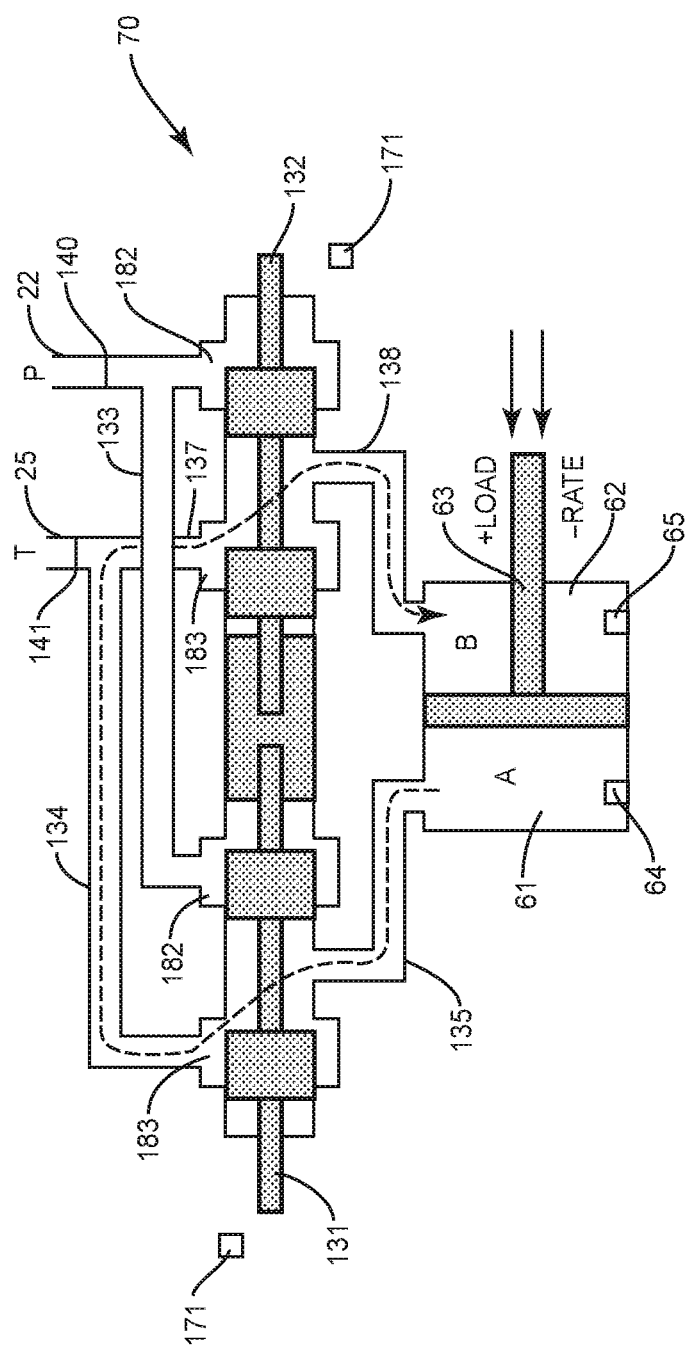
FIG. 12 is a schematic view of a dual spool valve providing second quadrant control to an actuator.

FIG. 12 illustrates the actuator 60 within the second quadrant Q2 having a positive load applied to the piston 63 and a negative rate. In the second quadrant Q2, the rate is controlled by the flow of hydraulic fluid out of the first chamber 61. Instead of outputting the hydraulic fluid from the first chamber 61 to the return line 25, the exiting hydraulic fluid is directed from the first chamber 61 to the second chamber 62. Regenerating the hydraulic fluid from the first chamber 61 to the second chamber 62 reduces the number of pressure cycles that are required to otherwise introduce hydraulic fluid into the chamber 62 of the actuator 60 from the supply line 22 and move the hydraulic fluid into and through the return line 25. As illustrated, the first spool 131 is in a first position that opens port 183 and blocks port 182. The second spool 132 is m the first position to open port 183 and block port 182. This allows hydraulic fluid from the first chamber 61 to move to the second chamber 62. The movement of the hydraulic fluid to the second chamber 62 can be caused by a pressure drop in the second chamber 62 due to the movement of the piston 63 towards the first chamber 61.

Figure 13:
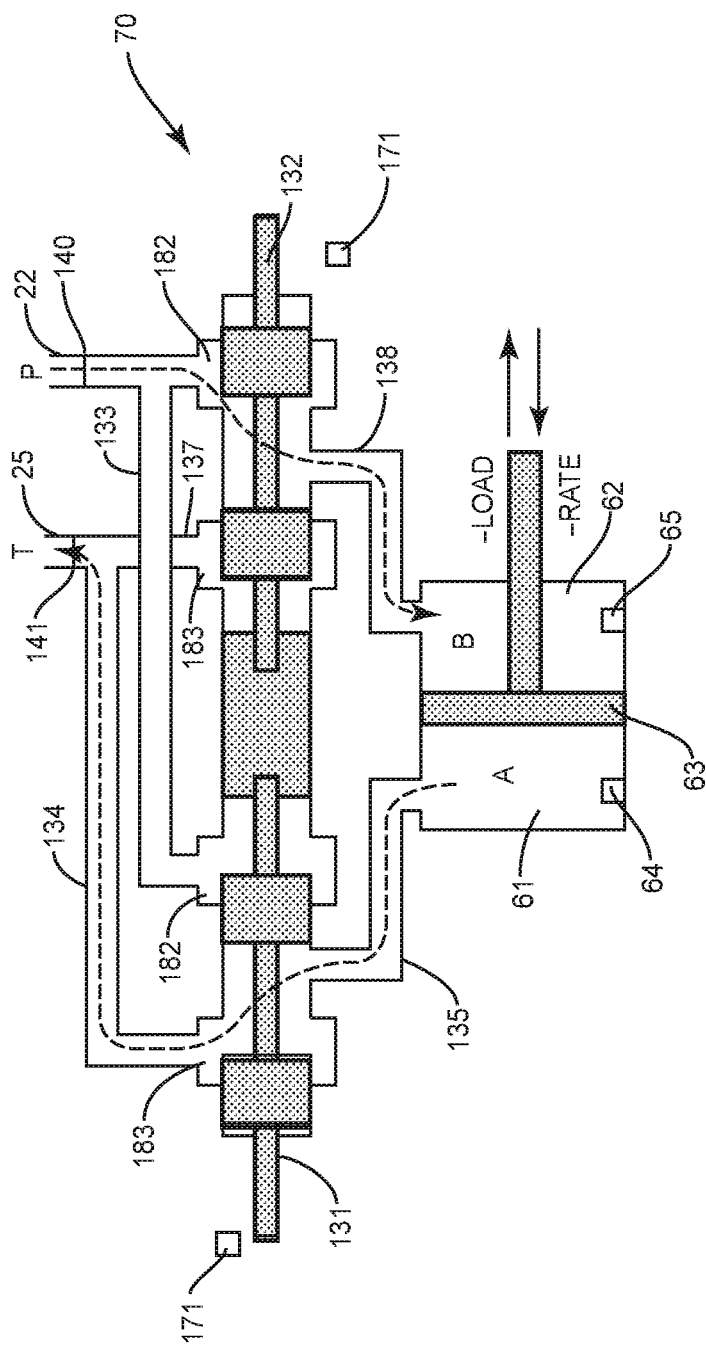
FIG. 13 is a schematic view of a dual spool valve providing third quadrant control to an actuator.

FIG. 13 illustrates the actuator 60 within the third quadrant Q3 having a negative load and a negative rate. In the third quadrant Q3, the rate is controlled by the flow of hydraulic fluid into the second chamber 62 from the first port 140. The first spool 131 is in the first position to open port 183 and block port 182. The second port is in the second position to block port 183 and open port 182. The second spool 132 is positioned for hydraulic fluid from the supply line 22 to move through lines 136-138 and into the second chamber 62. The first spool 131 is positioned for the hydraulic fluid to exit the first chamber 61 to the return line 25 through lines 135-134.

Figure 14:
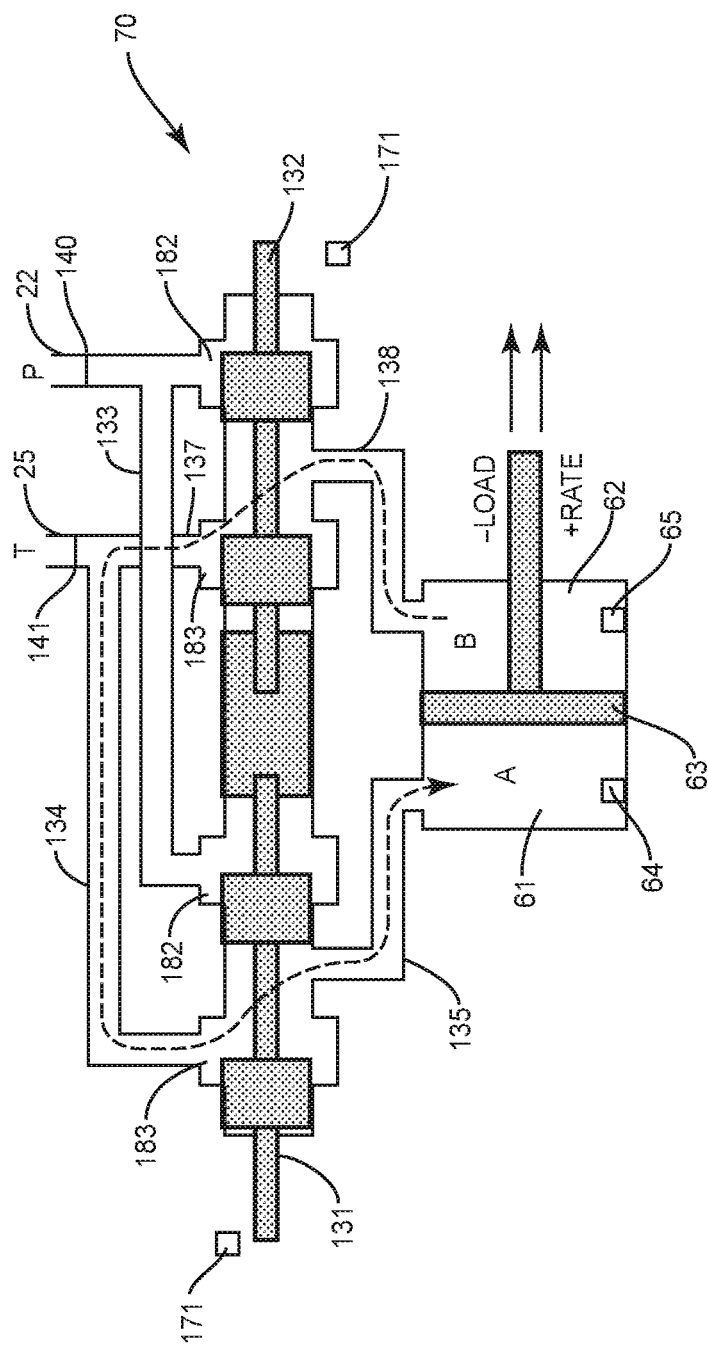
FIG. 14 is a schematic view of a dual spool valve providing fourth quadrant control to an actuator.

FIG. 14 illustrates the actuator 60 within the fourth quadrant with a negative load and a positive rate. In the fourth quadrant Q4, the rate is controlled by the flow of hydraulic fluid out of the second chamber 62. The first spool 131 is in the first position to open port 183 and block port 182. The second spool 132 is in the first position to open port 183 and block port 182. The second spool 132 is positioned to allow hydraulic fluid to flow out of the second chamber 62 through lines 138-137. The first spool 131 is positioned for the hydraulic fluid to move through lines 134-135 and into the first chamber 61. Again, this configuration regenerates the existing hydraulic fluid within the actuator 60 and thus reduces the number of needed pressure cycles to move hydraulic fluid through supply line 22 into the actuator 60 and out of the actuator 60 and through the return line 25.

The valve 70 provides for the actuation control unit 90 to have four quadrant control of the actuator 60. The actuation control unit 90 controls the solenoids 171 to position the first and second spools 131, 132 accordingly to provide for the control. Table 1 below lists the quadrants in which a boost is supplied by the hydraulic fluid entering through the supply line 22. The determination of boost is based on the hydraulic fluid P entering through the supply line 22, hydraulic fluid A in the first chamber 61, and the hydraulic fluid B in the second chamber 62. Table 2 includes the valve positioning for movement of the fluid for control of the actuator 60.

TABLE 1

| Boost Quadrants | Negative Rate | Positive Rate |
|---|---|---|
| Positive force | Q2: A ≥ B, no boost | Q1: P ≥ A + δP |
| Negative force | Q3: P ≥ B + δP | Q4: B ≥ A, no boost |

TABLE 2

| Control Quadrants | Negative Rate | Positive Rate |
|---|---|---|
| Positive force | Q2: regeneration A − B | Q1: P − A & B − T |
| Negative force | Q3: P − B & A − T | Q4: regeneration B − A |

For quadrant 1 Q1 (see FIG. 11), control occurs through hydraulic fluid entering into the first chamber 61 through the port 140. This includes the movement of hydraulic fluid from the supply line 22 to the first chamber 61 (P−A) and the movement of hydraulic fluid from the second chamber 62 to the return line 25 (B−T). A boost is applied when the pressure at the supply line 22 is less than the pressure at the first chamber 61 plus a margin (P≥A+δP). The margin provides for application of the load above the required pressure to account for various forces on the hydraulic fluid, such as surface friction and surface-inertia acceleration. One design includes a system pressure of 1200 psi and the margin is 300 psi.

For quadrant 2 Q2, no boost is required from the hydraulic fluid entering through the supply line 22 since the pressure A in the first chamber 61 is greater than or equal to the pressure B in the second chamber 62 (A≥B). Control in the second quadrant Q2 occurs through hydraulic fluid exiting the first chamber 61 and entering the second chamber 62 (A−B).

For quadrant 3 Q3, control occurs through the movement of hydraulic fluid from the supply line 22 into the second chamber 62 (P−B) and movement of hydraulic fluid from the first chamber 61 to the return line 25 (A−T). A boost is applied when the pressure at the supply line 22 is less than the pressure at the second chamber 62 plus the margin (P≥B+δP).

For quadrant 4 Q4, no boost is required from the hydraulic fluid entering through the supply line 22 since the pressure B in the second chamber 62 is greater than or equal to the pressure A in the first chamber 61 (B≥A). Control in the fourth quadrant Q4 occurs through hydraulic fluid exiting the second chamber 62 and entering the first chamber 62 (B−A).

The hydraulic system 20 can supply hydraulic fluid to more than one actuator 60. The multiple actuators 60 can be connected to one or more flight control members 11. In one design, the hydraulic system 20 supplies fluid to multiple actuators 60 located along a wing of the aircraft 10 that control the movement of multiple flight control members 11 along the wing.

Boost control when a hydraulic system 20 supports multiple actuators provides for determining an error for each of the actuators. The largest error amongst the support actuators 60 is then used to control the system pressure. This ensures that the hydraulic system 20 is able to adequately support each of the actuators 60. For each actuator, the error in the first quadrant Q1 is e=(A+δP)−P. In the third quadrant Q3, the error e=(B+δP)−P. For the second and fourth quadrants Q2, Q4, the error is equal to zero.

Figure 15:
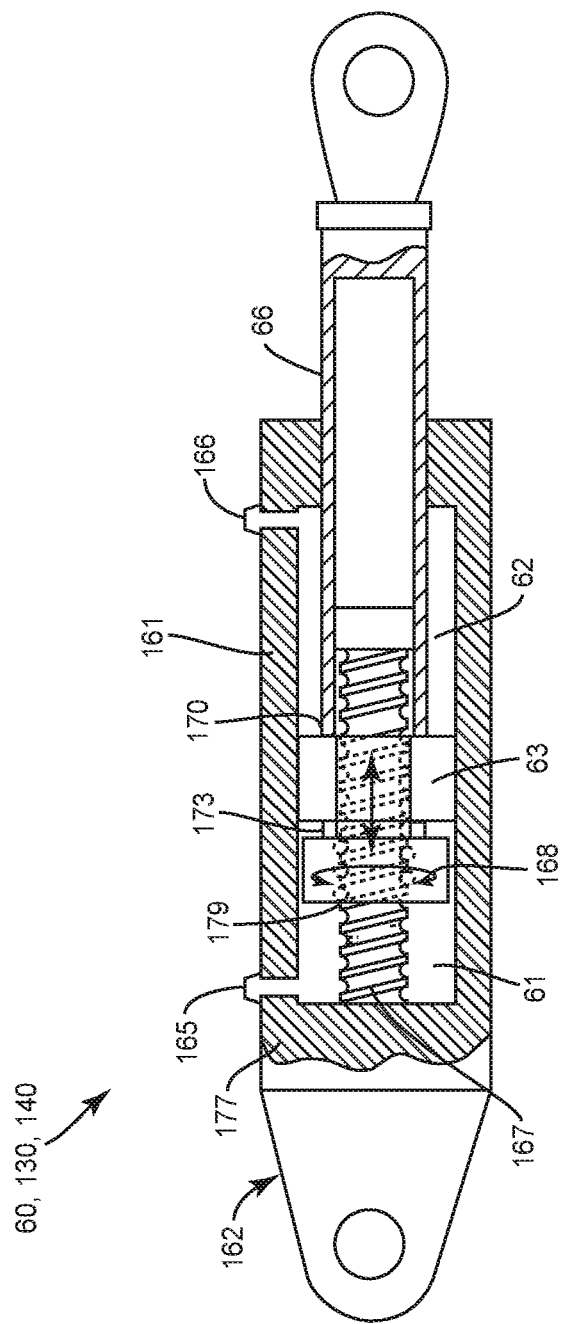
FIG. 15 is a schematic section view of an actuator.
Figure 16:
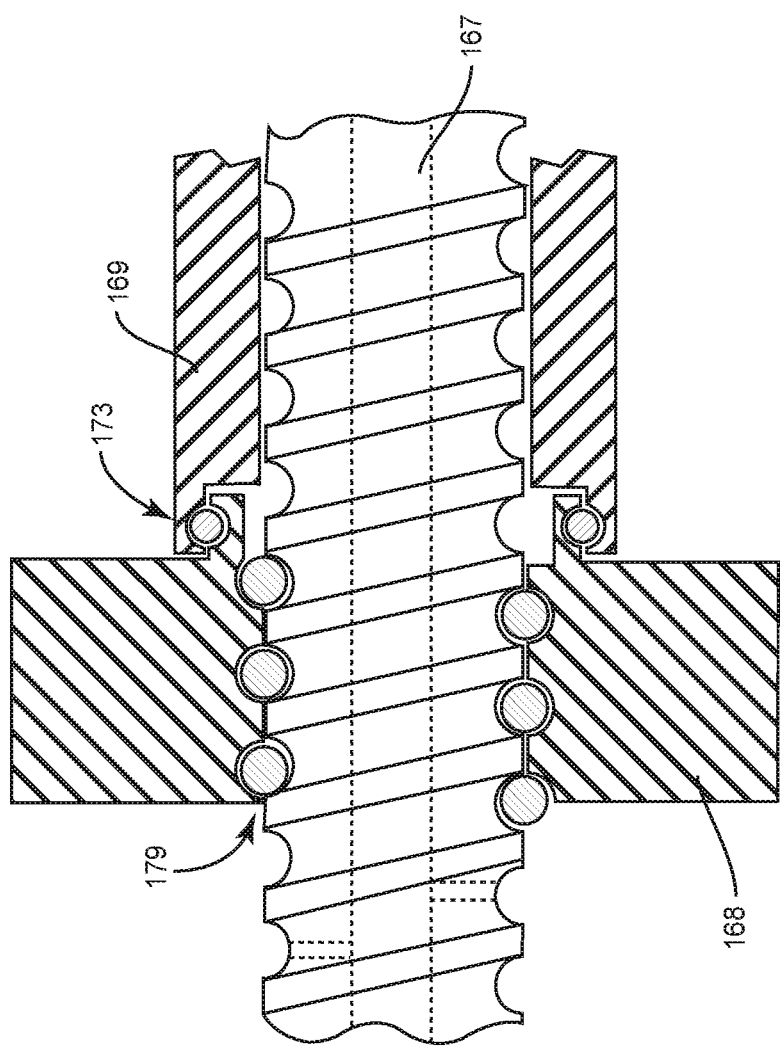
FIG. 16 is a magnified view of a section of the actuator of FIG. 15.

A variety of different hydraulic actuators 60 can be used to move the flight control members 11. One actuator 60 includes an integrated inerter as illustrated in FIGS. 15 and 16. The actuator 60 includes a first terminal 162 that includes a housing 161, and a second terminal 163 that includes the rod 69. Each of the first and second terminals 162, 163 can be configured to attached to either a structural members in the aircraft 10 or the flight control member 11. The housing 161 extends around and encloses the first and second chambers 61, 62. The first chamber 61 includes a port 165 and the second chamber 62 includes a port 166. The ports 165, 166 provide for the hydraulic fluid to flow into and out of each of the first and second chambers 61, 62. A threaded shaft 167 extends outward from an end wall 177 and into the first chamber 61. A flywheel 168 is threaded onto the threaded shaft 167 and is movable by relative rotation along the length. The flywheel 168 rotates in proportion to an axial rate of the rod 66 that extends through an opening in an end wall of the housing 161. The rod 66 includes an inner end 170 that is hollow and extends around the threaded shaft 167.

The piston 63 is mounted to the inner end of the rod 66. The piston 63 includes an outer diameter that substantially matches the inner diameter of the first and second chambers 61, 62. A seal (not illustrated) such as an O-ring can extend around the outer perimeter of the piston 63 to seal against the wall of the first and second chambers 61, 62. The piston 63 is axially slidable within the chambers 61, 62. The piston 63 can provide for an unbalanced setting with one of the sides of the piston 63 having a greater cross-sectional area than the opposite piston side. The piston can also be balanced with the opposing sides have the same cross-sectional area. The piston 63 also includes an inner opening that extends around the shaft 167.

The flywheel 168 is mounted in the first chamber 61 and is rotatably coupled to the piston 63 at a flywheel annulus 179. The flywheel 168 is configured to rotationally accelerate in proportion to axial acceleration of the piston 63 and piston rod 66 relative to the shaft 167. A bearing 173 can be positioned along the shaft 167 between the flywheel 168 and the piston 63.

FIG. 16 illustrates a magnified sectional view of FIG. 15 illustrating the flywheel 168 coupled to the rod 66 at the flywheel annulus 179. The flywheel annulus 179 is also threadably engaged to the shaft 167. The shaft 167 can be configured as a ball screw with helical grooves for receiving ball bearings which couple similarly-configured helical grooves in the flywheel annulus 179 to the ball screw with minimal friction. Although not illustrated, the flywheel annulus 179 can include a ball nut for circulating the ball bearings coupling the flywheel 168 to the ball screw. In another example not shown, the threaded shaft 167 can include a lead screw with threads to which the flywheel annulus 179 is directly engaged. The flywheel 168 can be configured for engagement to any one of a variety of different types of configurations of threaded shafts, and is not limited to the ball screw.

FIG. 16 also illustrates a bearing 173 for coupling the flywheel annulus 179 to the rod 66 such that the rod 66 and flywheel 168 can translate in unison as the flywheel 168 rotates due to threadable engagement with the threaded shaft 167. Although the bearing 173 is shown as a bearing, the bearing 173 can be provided in any one a variety of different configurations capable of axially coupling the flywheel 168 to the rod 66 with a minimal amount of axial free play. For example, the bearing 173 can be configured as a roller bearing (not shown). In still further examples, the flywheel 168 can be coupled to the rod 66 without a bearing while still allowing the flywheel 168 to rotate during translation of the rod 66 and flywheel 168 relative to the threaded shaft 67.

Figure 17:
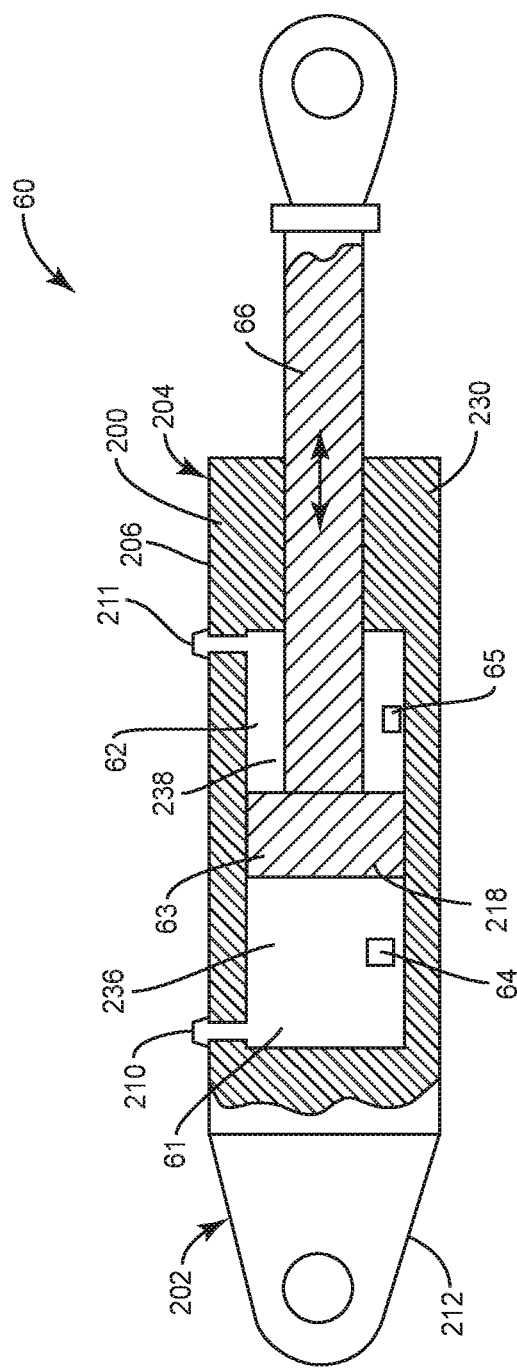
FIG. 17 is a schematic sectional view of an actuator.

FIG. 17 illustrates an actuator 60 that can extend between a support member and a flight control member 11. The actuator 60 includes a housing 200 that extends around and forms an interior chamber. The piston 63 extends across and divides the chamber into the first chamber 61 and the second chamber 62. A first port 210 leads into the first chamber 61 and a second port 211 leads into the second chamber 62.

Figure 18:
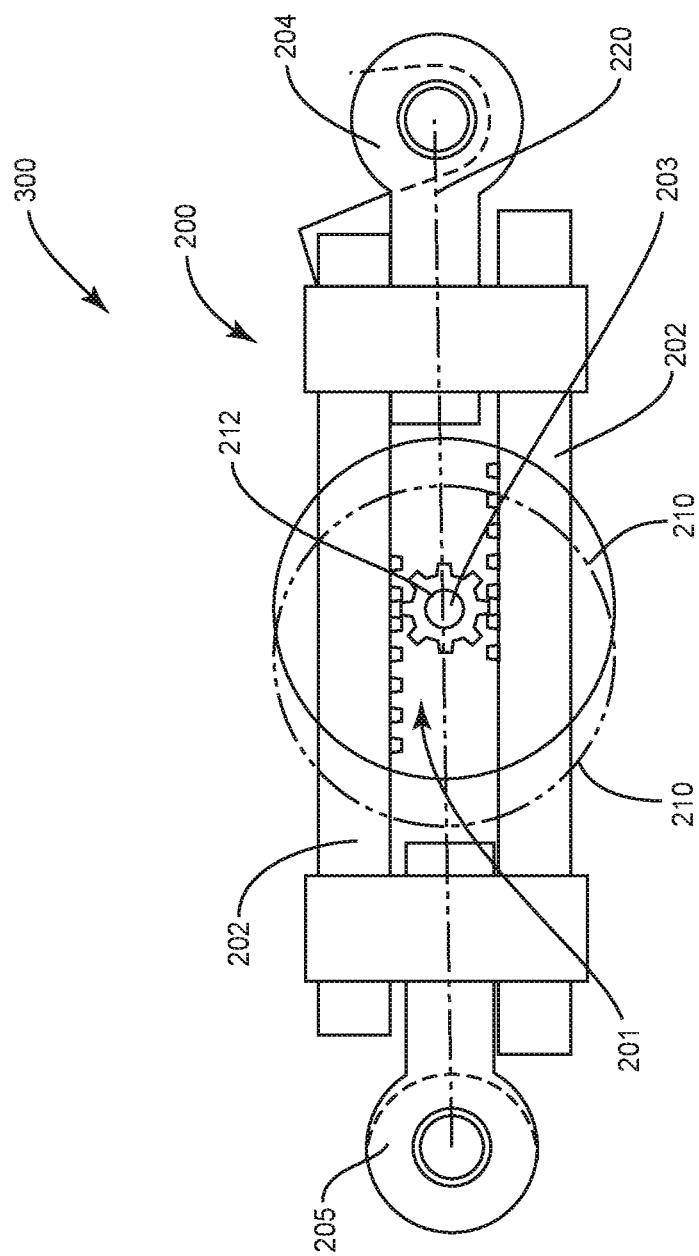
FIG. 18 is a schematic side view of an inerter that can be attached to a flight control member.

An inerter 300 can also be attached to the flight control member 11 in combination with an actuator 60 to dampen the flight control member 11. FIGS. 15 and 16 include an inerter that is integrated with the actuator 60. FIG. 18 illustrates another inerter 300 that separately attaches to the flight control member 11. The inerter 300 includes a dual rack and pinion structure with a circular pinion that engages two linear gear racks. Rotational motion applied to the pinion causes the racks to move relative to each other and relative to the pinion, thus translating the rotational motion of the pinion into linear motion.

The inerter 300 includes a flexible holding structure 200 and a dual rack and pinion assembly 201 held or clamped by and between the flexible holding structure 200. The dual rack and pinion assembly 201 includes dual racks 202 positioned opposite each other and substantially housed within and held or clamped by the flexible holding structure 200. The racks 202 include a first rack and a second rack that each have teeth. The dual rack and pinion assembly 201 also includes a pinion 203, such as in the form of a pinion gear, engaged to and between the first and second racks 202. The pinion 203 has gear teeth configured to engage the teeth of the first and second racks 202. A first terminal 204 is coupled to the first rack 202 and a second terminal 205 is coupled to the second rack 202.

The inerter 300 also includes a pair of inertia wheels 210. The inertia wheels 210 are each respectively positioned adjacent to opposite exterior sides of the flexible holding structure 200. An axle element 212 extends through the first inertia wheel 210, the flexible holding structure 200, the pinion 203, and the second inertia wheel 210. Movement of the flight control member 11 (that is mounted to one of the terminals 204, 205) causes translational movement of the first rack 202 relative to the second rack 202, along a longitudinal inerter axis 220 which causes the rotational movement of the pinion 203 and the pair of inertia wheels 210 such that the rotational movement of the pinion 203 is resisted by the pair of inertia wheels 210 and there is no incidental motion. This results in the dual rack and pinion assembly 201 damping movement of the flight control member 11.

The motion of the pinion 203 is resisted by the inertia wheels 210 such that the change of orientation of the racks 202 are just in relation to the longitudinal inerter axis 220 by inducing a resistance force to the rotation of the first terminal 204 connected to the flight control member 11. The resistance force is resisted by the inertia wheels 210. Damping movement of the flight control member 11 provides increased flutter suppression. This can result in an improved hydraulic application stability and an increased efficient flight control actuation by the actuator 60.

The valve 70 and methods of control the movement of hydraulic fluid can be used with a variety of aircraft 10. One aircraft includes a commercial aircraft that includes rows of seats each configured to accommodate a passenger. Other aircraft 10 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

Figure 20:
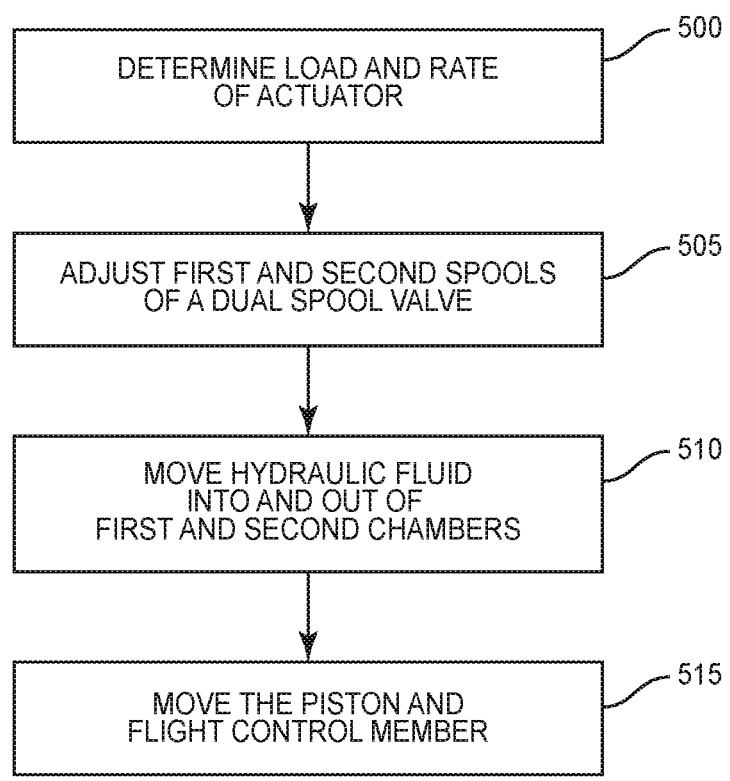
FIG. 20 is a flowchart diagram of a method of controlling a valve to adjust an actuator and operatively connected flight control member.

FIG. 20 illustrates a method of controlling the valve 70 to change the orientation of the flight control member 11. The load and commanded rate of the actuator 60 is determined by the actuation control unit 90 (block 500). The commanded rate can be a function of a commanded position instruction received from the flight control system 99. The load can be determined based on the pressure of the hydraulic fluid in one or both of the first and second chambers 61, 62. The actuation control unit 90 then signals the solenoids 171 to position the first and second spools 131, 132 (block 505). The hydraulic fluid is then moved into and out of the first and second chambers 61, 62. Dependent upon the quadrant, this can include introducing hydraulic fluid from the supply line 22 and/or moving the hydraulic fluid between the first and second chambers 61, 62. The moving hydraulic fluid causes the piston 63 of the actuator 60 to move the flight control member 11 (block 515).

The actuator 60 with the integrated hydraulic actuator 130 and inerter 140 provides benefits that conventional actuator systems do not provide, or are not capable of providing. For example, the actuator 60 of the present aspects creates or contributes to a system that beneficially allows for significant savings in the power consumption of the aircraft 10 by increasing the damping of the actuator 60 which permits reduced actuator piston area and reduced flow proportional to the area reduction. Such reductions allow the hydraulic system 20 to provide hydraulic fluid at reduced flow rate. Additionally, because the actuator 60 of the present disclosure controls flutter, fewer hydraulic actuators 60 are needed on aircraft 10 thereby requiring less power to be generated by the engines 12 of the aircraft 10.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A valve to direct hydraulic fluid to a hydraulic actuator in an aircraft, the valve comprising:
    a first port to receive hydraulic fluid from a supply line;
    a second port to discharge hydraulic fluid to a return line;
    first and second valve sections each comprising a manifold, a first line fluidly connected to the first port, a second line fluidly connected to the second port, and a third line fluidly connected to the actuator and with the manifold of the first valve section being spaced away from the manifold of the second valve section;
    a first spool positioned in the first manifold and a second spool positioned in the second manifold, each of the first and second spools movable to prevent the flow of hydraulic fluid when aligned with one of the first and second lines;
    each of the first and second spools independently positionable within the respective first and second manifolds between a first position aligned with just one of the first and second lines, and a second position aligned with just the other of the first and second lines, and with the first and second spools spaced away from the third lines in each of the first and second positions to allow hydraulic fluid to flow into and out of the actuator.

2. The valve of claim 1, wherein each of the first and second spools comprises a first block and a second block that are spaced apart along a shaft and with the first blocks aligned with one of the first and second lines in the first position and with the second blocks aligned with the other of the first and second lines in the second position and with both the first and second blocks positioned away from the third lines in each of the first and second positions.

3. The valve of claim 1, wherein the first lines of the first and second valve sections share a first common section and the second lines of the first and second valve sections share a second common section.

4. The valve of claim 1, wherein each of the first and second valve sections is a 3-way valve.

5. An assembly to position a flight control member of an aircraft, the assembly comprising:
    a hydraulic actuator operatively connected to the flight control member and comprising a piston, a first chamber on a first side of the piston, and a second chamber on a second side of the piston;
    a dual spool valve comprising first and second manifolds that each include a supply port to receive fluid from a supply line, a return port to move fluid to a return line, and an actuator port to move fluid to the actuator; and
    a first spool movably positioned in the first manifold and a second spool movably positioned in the second manifold, the first and second spools being independently movable between a first position and a second position;
    in the first position, the first and second spools blocking the supply ports to prevent hydraulic fluid from moving from the supply line to the actuator and being away from the return ports to allow hydraulic fluid to move from the actuator to the return line;
    in the second position, the first and second spools positioned away from the supply ports to allow hydraulic fluid to move from the supply line to the actuator and blocking the return ports to prevent hydraulic fluid from moving from the actuator to the return line;
    the first and second spools being positioned away from the actuator ports in each of the first and second positions to allow hydraulic fluid to flow into and out of the actuator.

6. The assembly of claim 5, wherein the first spool is in the first position when the second spool is in the second position.

7. The assembly of claim 5, wherein the actuator port of the first manifold is fluidly connected to the first chamber of the actuator and the actuator port of the second manifold is fluidly connected to the second chamber of the actuator.

8. The assembly of claim 5, wherein each of the first and second spools comprises a first block and a second block that are spaced apart along a shaft, the first and second blocks sized with one of the first and second blocks extending across one of the return and the supply ports in each of the first and second positions.

9. The assembly of claim 5, wherein the dual spool valve further comprises first lines that extend between the supply line and the supply ports and second lines that extend between the return line and the return ports with the first lines being isolated from the second lines.

10. The assembly of claim 9, wherein the first lines share a first common section and the second lines share a second common section.

11. A method of controlling a dual spool valve to control a hydraulic actuator and move a flight control member of an aircraft, the method comprising:
    positioning a first spool in a first manifold at a second position and opening a supply port in the first manifold and moving hydraulic fluid from a supply line and into a first chamber of a hydraulic actuator and positioning a second spool in a second manifold at a first position and opening a return port in the second manifold and moving hydraulic fluid from a second chamber of the hydraulic actuator to a return line and moving a piston of the hydraulic actuator in a first direction;
    positioning the first spool in the first manifold at a first position and opening a return port in the first manifold and positioning the second spool in the second manifold at the first position and opening the return port in the second manifold and moving hydraulic fluid from the first chamber of the hydraulic actuator through the return port in the first manifold and through the return port in the second manifold and into the second chamber of the hydraulic actuator and moving the piston of the hydraulic actuator in a second direction;
    positioning the first spool in the first manifold at the first position and opening the return port in the first manifold and moving hydraulic fluid from the first chamber to the return line and positioning the second spool in the second manifold to a second position and opening a supply port in the second manifold and moving hydraulic fluid from the supply line and into the second chamber of the hydraulic actuator and moving the piston of the hydraulic actuator in the second direction; and
    positioning the first spool in the first manifold at the first position and opening the return port in the first manifold and positioning the second spool in the second manifold to the first position and opening the return port in the second manifold and moving hydraulic fluid from the second chamber of the hydraulic actuator through the return port in the second manifold and through the return port in the first manifold and into the first chamber of the hydraulic actuator and moving the piston of the hydraulic actuator in the first direction.

12. The method of claim 11, further comprising moving hydraulic fluid through the first manifold when moving hydraulic fluid into and from the first chamber of the hydraulic actuator and moving hydraulic fluid through the second manifold when moving hydraulic fluid into and from the second chamber.

13. The method of claim 11, further comprising positioning the first spool in the first manifold at the first position and blocking hydraulic fluid from moving into the first chamber through the supply port of the first manifold.

14. The method of claim 13, further comprising positioning the first spool in the first manifold at the second position and blocking hydraulic fluid from moving through the return port of the first manifold.

15. The method of claim 11, further comprising positioning the second spool in the second manifold at the first position and blocking hydraulic fluid from moving into the second chamber through the supply port of the second manifold.

16. The method of claim 15, further comprising positioning the second spool in the second manifold at the second position and blocking hydraulic fluid from moving through the return port of the second manifold.

17. The method of claim 11, further comprising moving the first spool independently from the second spool.

18. The method of claim 11, further comprising sensing pressure of the hydraulic fluid in each of the first and second chambers and pressure of the hydraulic fluid in the supply line.

19. A hydraulic system of an aircraft that operates according to the method of claim 11.

20. An aircraft with a dual spool valve that operates according to the method of claim 11.

* * * * *